(12) United States Patent
Toshioka et al.

(10) Patent No.: US 8,133,444 B2
(45) Date of Patent: Mar. 13, 2012

(54) EXHAUST GAS PURIFICATION SYSTEM FOR INTERNAL COMBUSTION ENGINE

(75) Inventors: Shunsuke Toshioka, Susono (JP); Tomihisa Oda, Numazu (JP); Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 258 days.

(21) Appl. No.: 12/450,604

(22) PCT Filed: Apr. 7, 2008

(86) PCT No.: PCT/JP2008/057219
§ 371 (c)(1),
(2), (4) Date: Oct. 2, 2009

(87) PCT Pub. No.: WO2008/126924
PCT Pub. Date: Oct. 23, 2008

(65) Prior Publication Data
US 2010/0111774 A1 May 6, 2010

(30) Foreign Application Priority Data
Apr. 5, 2007 (JP) ................................. 2007-099761

(51) Int. Cl.
*B01D 50/00* (2006.01)

(52) U.S. Cl. ........................................................ 422/182
(58) Field of Classification Search .................. 422/168, 422/177, 180; 60/274
See application file for complete search history.

(56) References Cited

FOREIGN PATENT DOCUMENTS

| | | |
|---|---|---|
| JP | A-2003-293743 | 10/2003 |
| JP | A-2004-270565 | 9/2004 |
| JP | A-2004-293489 | 10/2004 |
| JP | A-2006-274844 | 10/2006 |
| JP | A-2006-342734 | 12/2006 |

*Primary Examiner* — Tom Duong
(74) *Attorney, Agent, or Firm* — Oliff & Berridge, PLC

(57) ABSTRACT

An object of the present invention is to suppress, in a system in which an NOx selective catalytic reduction catalyst and a particulate filter are provided in an exhaust passage of an internal combustion engine, discharge of ammonia from the NOx selective catalytic reduction catalyst. In the exhaust gas purification system for an internal combustion engine according to the present invention, when a condition for executing a filter temperature raising control is satisfied, the supply of urea to the NOx selective catalytic reduction catalyst by urea supply means is stopped, and the filter temperature raising control is executed by filter temperature raising means after a specific time has elapsed since the time of stoppage of the supply of urea to the NOx selective catalytic reduction catalyst.

15 Claims, 5 Drawing Sheets

US 8,133,444 B2

EXHAUST GAS PURIFICATION SYSTEM FOR INTERNAL COMBUSTION ENGINE

This application is the national phase application under 35 U.S.C. §371 of PCT international application No. PCT/JP2008/057219 filed on 7 Apr. 2008, which claims priority to Japanese patent application No. 2007-099761 filed on 5 Apr. 2007, the contents of which are incorporated herein by reference.

TECHNICAL FIELD

The present invention relates to an NOx selective catalytic reduction catalyst that reduces NOx in the exhaust gas using ammonia as a reducing agent and an exhaust gas purification system for an internal combustion engine equipped with a particulate filter that traps particulate matter in the exhaust gas.

BACKGROUND ART

As an exhaust gas purification system for an internal combustion engine, there is a known system having an NOx selective catalytic reduction catalyst that is provided in an exhaust passage of the internal combustion engine to reduce NOx in the exhaust gas using ammonia as a reducing agent. In such an exhaust gas purification system, urea is supplied to the NOx selective catalytic reduction catalyst. Urea thus supplied is once adsorbed by the NOx selective catalytic reduction catalyst, and adsorbed urea is hydrolyzed to produce ammonia. Ammonia serves as a reducing agent to reduce NOx in the exhaust gas.

In some cases, a particulate filter (which will be simply referred to as "filter" hereinafter) that traps particulate matter (which will be referred to as "PM" hereinafter) in the exhaust gas is provided in the exhaust passage of the internal combustion engine. When this is the case, the temperature of the filter is sometimes raised to remove the PM trapped in the filter.

Japanese Patent Application Laid-Open No. 2004-270565 discloses a configuration in which an oxidation catalyst, a filter, a liquid injection nozzle for injecting urea-based liquid into the exhaust gas, an NOx selective catalytic reduction catalyst, and a catalyst for preventing slippage of ammonia are arranged in order from the upstream in the exhaust passage. In this configuration disclosed in Japanese Patent Application Laid-Open No. 2004-270565, an EGR pipe and an EGR valve are further provided. The liquid injection nozzle and the EGR valve are controlled based on the operation state of the internal combustion engine.

DISCLOSURE OF THE INVENTION

In the case where an NOx selective catalytic reduction catalyst and a filter are provided in an exhaust passage of an internal combustion engine, the temperature of the NOx selective catalytic reduction catalyst may also rise as the temperature of the filter is raised, in some cases. If the temperature of the NOx selective catalytic reduction catalyst rises steeply, hydrolysis of urea adsorbed in the NOx selective catalytic reduction catalyst is promoted drastically, and the quantity of ammonia produced thereby increases rapidly. In consequence, the amount of ammonia discharged from the NOx selective catalytic reduction catalyst without being consumed in reduction of NOx may increase.

The present invention has been made in view of the above-described problem and has as an object to provide a technology that enables, in a system in which an NOx selective catalytic reduction catalyst and a filter are provided in an exhaust passage of an internal combustion engine, suppression of the discharge of ammonia from the NOx selective catalytic reduction catalyst.

According to the present invention, when a condition for executing a process for raising the temperature of the filter is satisfied, the supply of urea to the NOx selective catalytic reduction catalyst is stopped, and the process for raising the temperature of the filter is executed after a specific period of time has elapsed since the time of stoppage of the supply of urea.

Specifically, an exhaust gas purification system for an internal combustion engine according to the present invention is characterized by comprising:

an NOx selective catalytic reduction catalyst that is provided in an exhaust passage of the internal combustion engine to reduce NOx in the exhaust gas using ammonia as a reducing agent;

urea supply unit for supplying urea to the NOx selective catalytic reduction catalyst;

a particulate filter that is provided in said exhaust passage to trap particulate matter in the exhaust gas; and filter temperature raising unit for executing a filter temperature raising control to raise the temperature of said particulate filter, wherein when a condition for executing said filter temperature raising control is satisfied, supply of urea to said NOx selective catalytic reduction catalyst by said urea supply unit is stopped, and said filter temperature raising control is executed by said filter temperature raising unit after a specific period of time has elapsed since the time of stoppage of supply of urea to said NOx selective catalytic reduction catalyst by said urea supply unit.

In the present invention, when the condition for executing the filter temperature raising control is satisfied, the supply of urea to the NOx selective catalytic reduction catalyst is stopped. Then, after the specific period of time has elapsed since the time of stoppage of the supply of urea to the NOx selective catalytic reduction catalyst, the filter temperature raising control is executed.

According to this, urea having been adsorbed in the NOx selective catalytic reduction catalyst until the condition for executing the filter temperature raising control is satisfied changes into ammonia and the ammonia is consumed in the reduction of NOx during the specific period of time. Then, after the quantity of urea adsorbed in the NOx selective catalytic reduction catalyst has decreased, the filter temperature raising control is executed. Therefore, the discharge of ammonia from the NOx selective catalytic reduction catalyst as the temperature of the NOx selective catalytic reduction catalyst has become higher with the execution of the filter temperature raising control can be suppressed.

The system according to the present invention may further comprise adsorbed urea quantity estimation unit for estimating the quantity of urea adsorbed in the NOx selective catalytic reduction catalyst. In this case, when the quantity of urea adsorbed in the NOx selective catalytic reduction catalyst at a time when the condition for executing the filter temperature raising control is satisfied is equal to or larger than a first specific adsorption quantity, the supply of urea to the NOx selective catalytic reduction catalyst by the urea supply unit may be stopped.

Here, the first specific adsorption quantity may be a threshold value that allows a determination that an unduly large quantity of ammonia will be discharged from the NOx selective catalytic reduction catalyst if the temperature of the NOx selective catalytic reduction catalyst rises with the execution of the filter temperature raising control when the quantity of urea adsorbed in the NOx selective catalytic reduction catalyst is equal to or larger than the first specific adsorption quantity.

By the above-described process also, the discharge of ammonia from the NOx selective catalytic reduction catalyst as the temperature of the NOx selective catalytic reduction catalyst has become higher with the execution of the filter temperature raising control can be suppressed.

In the above-described case, the specific period of time may be a period of time taken for the quantity of urea adsorbed in the NOx selective catalytic reduction catalyst to decrease to be equal to or smaller than a second specific adsorption quantity that is smaller than the first specific adsorption quantity.

Here, the second specific adsorption quantity may be a threshold value that allows a determination that the quantity of ammonia discharged from the NOx selective catalytic reduction catalyst will fall within an allowable range even when the temperature of the NOx selective catalytic reduction catalyst rises with the execution of the filter temperature raising control if the quantity of urea adsorbed in the NOx selective catalytic reduction catalyst is equal to or smaller than the second specific adsorption quantity.

With this feature, the filter temperature raising control can be executed in a state in which the quantity of urea adsorbed in the NOx selective catalytic reduction catalyst has become sufficiently small.

The system according to the present invention may further comprise an ammonia oxidation catalyst that is provided in the exhaust passage downstream of the NOx selective catalytic reduction catalyst and has an ability of oxidizing ammonia, and NOx catalyst temperature raising unit for executing an NOx catalyst temperature raising control that raises the temperature of the NOx selective catalytic reduction catalyst during the specific period of time. In this case, in the NOx catalyst temperature raising control, the temperature of the NOx selective catalytic reduction catalyst is raised at a specific temperature rise rate that is lower than the temperature rise rate in the case where the temperature of the NOx selective catalytic reduction catalyst rises with the execution of the filter temperature raising control.

In the case where the temperature of the NOx selective catalytic reduction catalyst is raised by the NOx catalyst temperature raising unit also, hydrolysis of urea in the NOx selective catalytic reduction catalyst is promoted, and the quantity of ammonia discharged from the NOx selective catalytic reduction catalyst increases. However, the specific temperature rise rate is lower than the temperature rise rate in the case where the temperature of said NOx selective catalytic reduction catalyst rises with the execution of the filter temperature raising control. Therefore, the quantity of discharged ammonia on the occasion that the temperature of the NOx selective catalytic reduction catalyst is raised by the execution of the NOx catalyst temperature raising control is smaller than that in the case where the temperature of the NOx selective catalytic reduction catalyst rises with the execution of the filter temperature raising control.

Furthermore, the specific temperature rise rate may be a value at which it can be determined that the quantity of ammonia discharged from the NOx selective catalytic reduction catalyst will fall within a range of quantities that can be sufficiently oxidized in the ammonia oxidation catalyst. In this case, when the temperature of the NOx selective catalytic reduction catalyst is raised at the specific temperature rise rate, ammonia discharged from the NOx selective catalytic reduction catalyst is sufficiently oxidized in the ammonia oxidation catalyst. Consequently, outflow of ammonia to the downstream of the ammonia oxidation catalyst is suppressed.

Therefore, with the above feature, the quantity of urea adsorbed in the NOx selective catalytic reduction catalyst can be decreased more quickly during the specific period of time while suppressing outflow of ammonia to the downstream of the ammonia oxidation catalyst. Thus, in the case where the specific period of time is a fixed period, the quantity of urea adsorbed in the NOx selective catalytic reduction catalyst can be further decreased during the specific period of time. In consequence, the amount of ammonia discharged from the NOx selective catalytic reduction catalyst by the execution of the filter temperature raising control after the lapse of the specific period of time can be made smaller. On the other hand, in the case where the specific period of time is the time taken for the quantity of urea adsorbed in the NOx selective catalytic reduction catalyst to decrease from a quantity equal to or larger than the first specific adsorption quantity to a quantity equal to or smaller than the second specific adsorption quantity, the specific period of time can be made as short as possible. Consequently, the filter temperature raising control can be executed at an earlier time.

THE BEST MODE FOR CARRYING OUT THE INVENTION

In the following, specific embodiments of the exhaust gas purification system for an internal combustion engine according to the present invention will be described with reference to the drawings.

Embodiment 1

(General Configuration of Internal Combustion Engine and its Air-Intake and Exhaust System)

Figure 1:
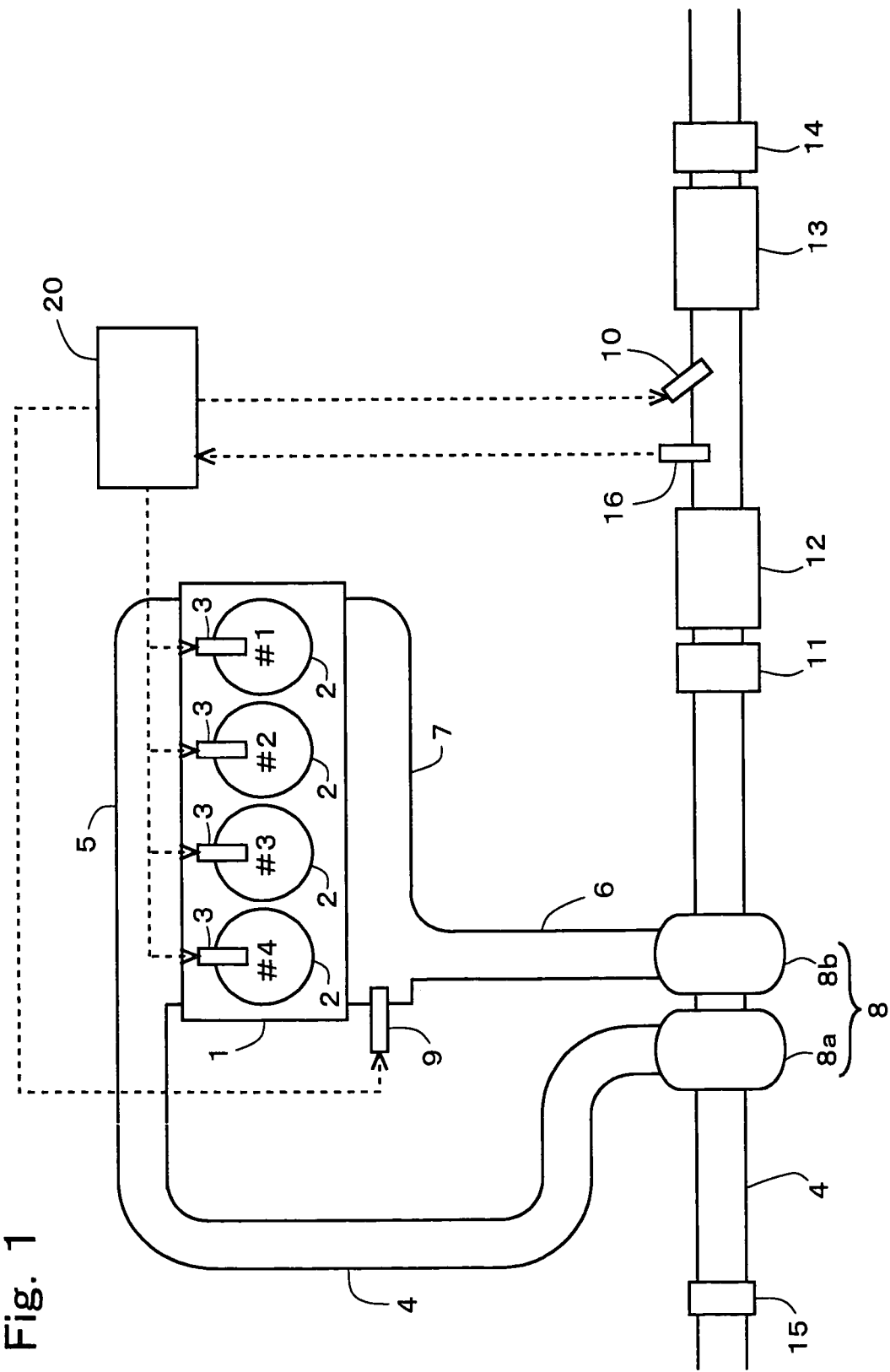
FIG. 1 is a diagram showing the general structure of an internal combustion engine and its air-intake and exhaust system according to embodiment 1.

FIG. 1 is a diagram showing the general configuration of an internal combustion engine and its air-intake and exhaust system according to this embodiment. The internal combustion engine 1 is a diesel engine having four cylinders 2 for driving a vehicle. Each cylinder 2 is equipped with a fuel injection valve 3 that injects fuel directly into the cylinder 2.

The internal combustion engine 1 is connected with an intake manifold 5 and an exhaust manifold 7. To the intake manifold 5 is connected one end of an intake passage 4. To the exhaust manifold 7 is connected one end of an exhaust passage 6. In this embodiment, the exhaust passage 6 is connected to the exhaust manifold 7 at a position near the fourth cylinder.

A compressor housing 8a of a turbocharger 8 is provided in the intake passage 4. A turbine housing 8b of the turbocharger 8 is provided in the exhaust passage 6. An air flow meter 15 is provided in the intake passage 4 upstream of the compressor housing 8a.

The exhaust manifold 7 is provided with a fuel addition valve 9 that adds fuel to the exhaust gas. An oxidation catalyst 11, a filter 12, an NOx selective catalytic reduction catalyst 13, and an ammonia oxidation catalyst 14, which are arranged in series in order from the upstream, are provided in the exhaust passage 6 downstream of the turbine housing 8b. The NOx selective catalytic reduction catalyst 13 is a catalyst that reduces NOx in the exhaust gas using ammonia as a reducing agent. A catalyst having an oxidizing ability, such as an oxidation catalyst, may be supported on the filter 12.

A temperature sensor 16 and a urea addition valve 10 are provided in the exhaust passage 6 between the filter 12 and the NOx selective catalytic reduction catalyst 13. The temperature sensor 16 is a sensor that senses the temperature of the exhaust gas. The urea addition valve 10 is a valve that adds urea solution to the exhaust gas. The urea addition valve 10 is supplied with urea solution from a urea solution tank (not shown) in which urea solution is stored. In this embodiment, the urea addition valve 10 corresponds to the urea supply unit according to the present invention.

Urea solution is added through the urea addition valve 10 at a time when the NOx selective catalytic reduction catalyst 13 is in an active state, whereby the urea solution is supplied to the NOx selective catalytic reduction catalyst 13. Urea in the urea solution supplied to the NOx selective catalytic reduction catalyst 13 is once adsorbed in the NOx selective catalytic reduction catalyst. The adsorbed urea is hydrolyzed to produce ammonia. The ammonia serves as a reducing agent when NOx in the exhaust gas is reduced.

To the internal combustion engine 1 is annexed an electronic control unit (ECU) 20. The ECU 20 is a unit that controls the operation state of the internal combustion engine 1. The ECU 20 is electrically connected with the air flow meter 15 and the temperature sensor 16. Output signals from them are input to the ECU 20.

The ECU 20 is also electrically connected with the fuel injection valve 3, the fuel addition valve 9, and the urea addition valve 10. They are controlled by the ECU 20.

(Filter Regeneration Control)

In this embodiment, a filter regeneration control for removing PM trapped in the filter 12 is performed. The filter regeneration control is performed by adding fuel through the fuel addition valve 9. The fuel added through the fuel addition valve 9 is supplied to the oxidation catalyst 11 and oxidized in the oxidation catalyst 11. The temperature of the filter 12 is raised by oxidation heat generated thereby. In the filter regeneration control, the temperature of the filter 12 is raised to a target temperature at which PM can be oxidized. Thus, PM is oxidized and removed from the filter 12. In this embodiment, the filter regeneration control corresponds to the filter temperature raising control according to the present invention.

As the filter regeneration control is performed, the temperature of the NOx selective catalytic reduction catalyst 13 also rises with rises in the temperatures of the oxidation catalyst 11 and the filter 12. However, if the temperature of the NOx selective catalytic reduction catalyst 13 rises steeply, hydrolysis of urea adsorbed in the NOx selective catalytic reduction catalyst 13 is promoted drastically, whereby the quantity of ammonia discharged from the NOx selective catalytic reduction catalyst 13 may increase.

(Filter Regeneration Control Routine)

In view of the above, in this embodiment, the addition of urea solution through the urea addition valve 10 is stopped before the filter regeneration control is executed. In the following, a routine of the filter regeneration control according to this embodiment will be described with reference to the flow chart shown in FIG. 2. This routine is stored in the ECU 20 in advance, and executed repeatedly at predetermined intervals during the operation of the internal combustion engine 1.

In this routine, first in step S101, the ECU 20 determines whether or not a condition for executing the filter regeneration control is satisfied. The condition for executing the filter regeneration control may be, for example, that an estimated value of the amount of PM trapped in the filter 12 becomes equal to or larger than a specific amount. In this embodiment, the condition for executing the filter regeneration control corresponds to the condition for executing the filter temperature raising control according to the present invention. If the determination in step S101 is affirmative, the ECU 20 proceeds to step S102, and if the determination is negative, the ECU 20 once terminates execution of this routine.

In step S102, the ECU 20 stops the addition of urea solution through the urea addition valve 10.

Then, the ECU 20 proceeds to step S103, where it determines whether or not a predetermined period of time Δts has elapsed since the time when the addition of urea solution through the urea addition valve 10 was stopped. The predetermined period of time Δts according to this embodiment is a fixed period of time that is determined in advance. If the determination in step S103 is affirmative, the ECU 20 proceeds to step S104, and if the determination is negative, the ECU 20 executes step S103 repeatedly.

In step S104, the ECU 20 starts the addition of fuel through the fuel addition valve 9 to execute the filter regeneration control. Thereafter, the ECU 20 once terminates execution of this routine. In this embodiment, the ECU 20 that executes step S104 corresponds to the filter temperature raising unit according to the present invention.

According to the above-described routine, when the condition for executing the filter regeneration control is satisfied, the addition of urea solution through the urea addition valve 10 is stopped. In other words, the supply of urea solution to the NOx selective catalytic reduction catalyst 13 is stopped. Then, after the predetermined period of time Δts has elapsed since the time of stoppage of the supply of urea solution to the NOx selective catalytic reduction catalyst 13, the filter regeneration control is executed.

According to the above process, urea having been adsorbed in the NOx selective catalytic reduction catalyst 13 until the condition for executing the filter regeneration control is satisfied changes into ammonia and the ammonia is consumed in the reduction of NOx during the lapse of the predetermined period of time Δts. Then after the quantity of urea adsorbed in the NOx selective catalytic reduction catalyst 13 has decreased, the filter regeneration control is executed. Therefore, the discharge of ammonia from the NOx selective catalytic reduction catalyst 13 as the temperature of the NOx selective catalytic reduction catalyst 13 has been made higher by the execution of the filter regeneration control can be suppressed.

(Modification)

Figure 3:
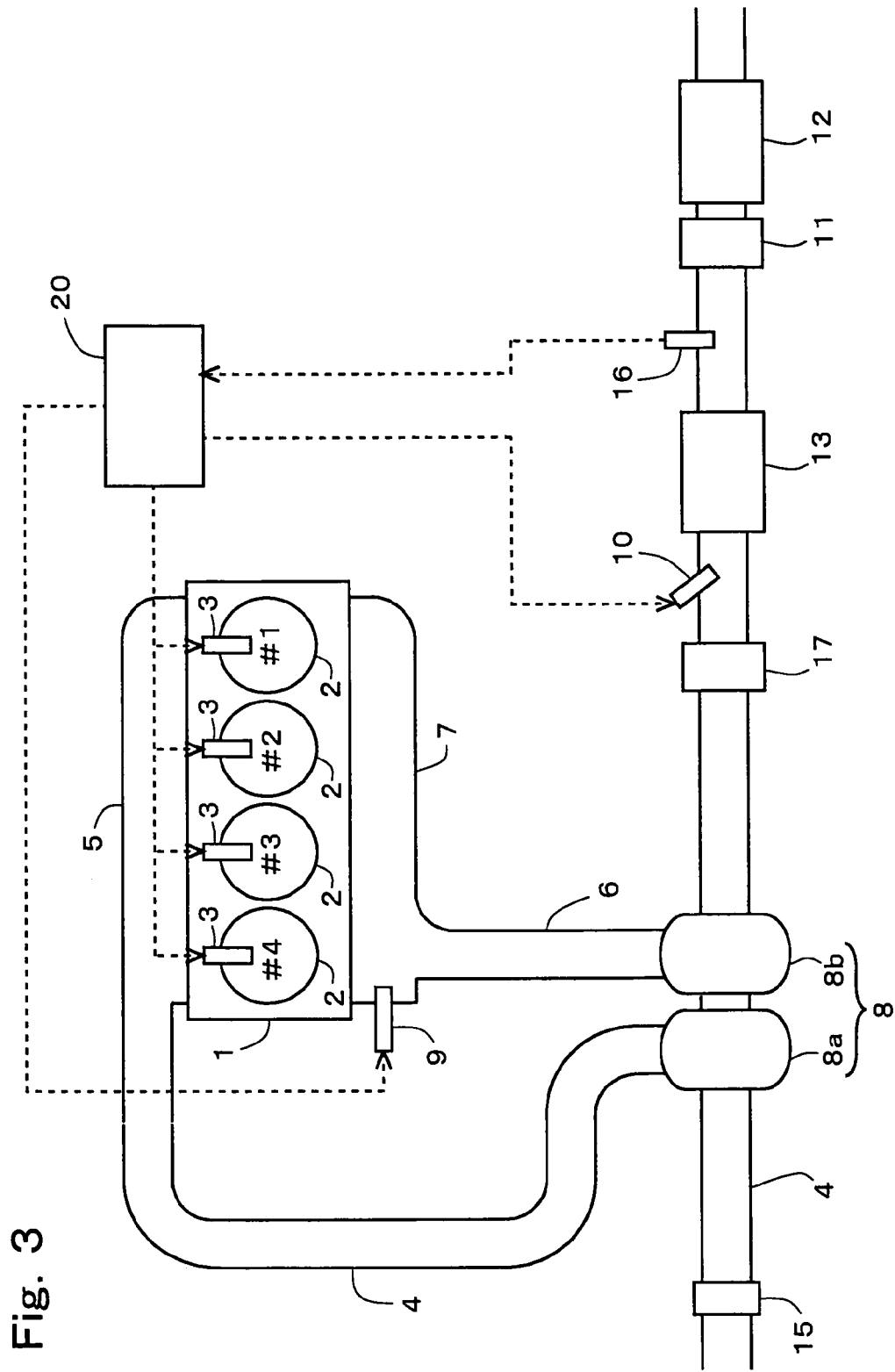
FIG. 3 is diagram showing the general structure of an internal combustion engine and its air-intake and exhaust system according to a modification of embodiment 1.

FIG. 3 is a diagram showing the general configuration of an internal combustion engine and its air-intake and exhaust system according to a modification of this embodiment. In this modification, an oxidation catalyst 17, an NOx selective catalytic reduction catalyst 13, an oxidation catalyst 11, and a filer 12, which are arranged in series from the upstream, are provided in the exhaust passage 6 downstream of a turbine housing 8b. A urea addition valve 10 is provided in the exhaust passage 6 between the oxidation catalyst 17 and the NOx selective catalytic reduction catalyst 13. A temperature sensor 16 is provided in the exhaust passage 6 between the NOx selective catalytic reduction catalyst 13 and the oxidation catalyst 11. The configuration other than the above is the same as the general configuration shown in FIG. 1.

In the configuration like this modification also, the filter regeneration control is performed by adding fuel through the fuel addition valve 9. The fuel added through, the fuel addition valve 9 is oxidized in the oxidation catalyst 17 and the oxidation catalyst 11, and the temperature of the filter 12 is raised by oxidation heat generated thereby.

Figure 2:
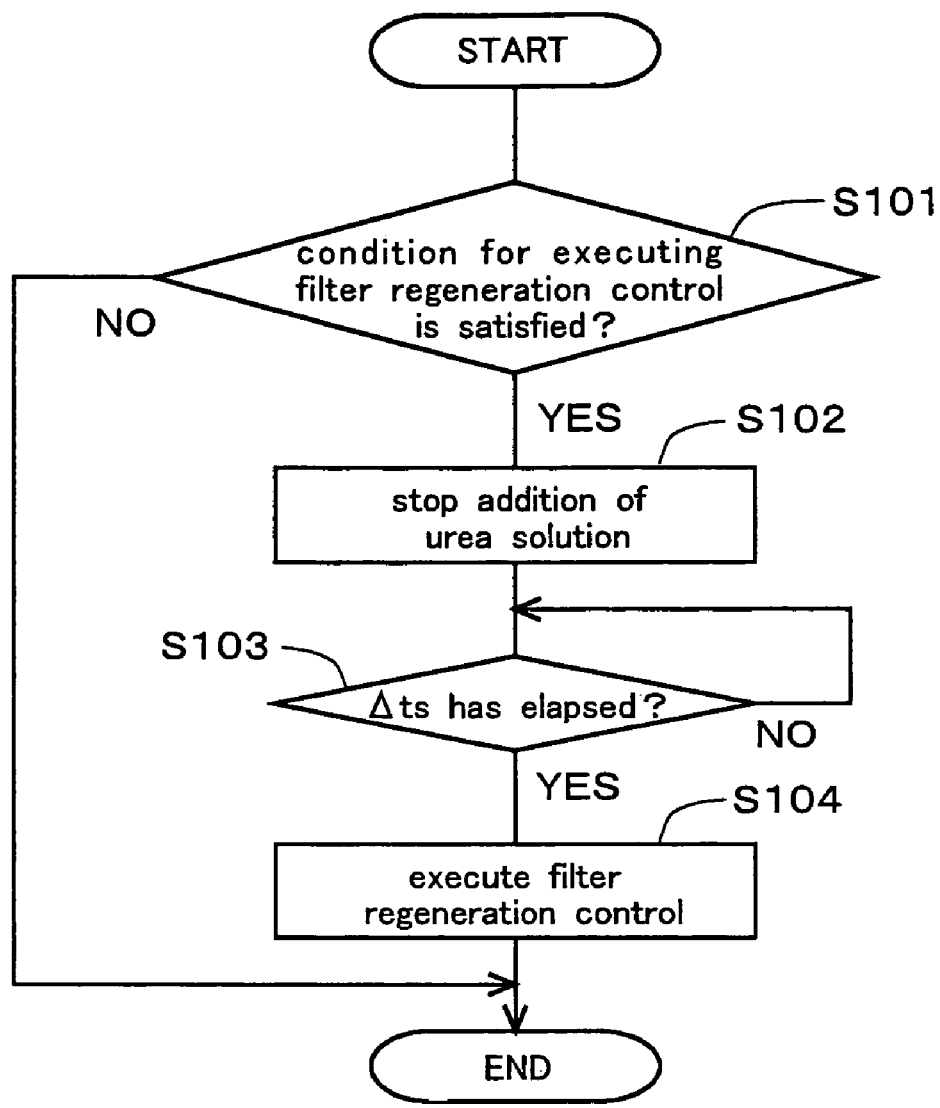
FIG. 2 is a flow chart of a filter regeneration control routine according to embodiment 1.

In this case also, the temperature of the NOx selective catalytic reduction catalyst 13 is raised by oxidation heat generated by oxidation of fuel in the oxidation catalyst 17. In other words, as the filter regeneration control is performed, the temperature of the NOx selective catalytic reduction catalyst 13 also rises. Therefore, the routine shown in FIG. 2 is also applied to the filter regeneration control according to this modification. Thus, the advantageous effects same as those of the system having the general configuration shown in FIG. 1 can be achieved.

Embodiment 2

The general configuration of an internal combustion engine and its air-intake and exhaust system according to this embodiment is the same as embodiment 1. In this embodiment also, a filter regeneration control similar to that in embodiment 1 is performed.

(Filter Regeneration Control Routine)

Here, a routine of the filter regeneration control according to this embodiment will be described with reference to the flow chart shown in FIG. 4. This routine is stored in the ECU 20 in advance, and executed repeatedly at predetermined intervals during the operation of the internal combustion engine 1.

In this routine, first in step S201, the ECU 20 determines whether or not a condition for executing the filter regeneration control is satisfied. The condition for executing the filter regeneration control is the same as that in embodiment 1. If the determination in step S201 is affirmative, the ECU 20 proceeds to step S202, and if the determination is negative, the ECU 20 once terminates execution of this routine.

In step S202, the ECU 20 calculates the quantity Qu of urea adsorbed in the NOx selective catalytic reduction catalyst 13 at the present time. The quantity Qu of urea adsorbed in the NOx selective catalytic reduction catalyst 13 can be calculated from the history of the operation state of the internal combustion engine 1 and the temperature of the exhaust gas flowing into the NOx selective catalytic reduction catalyst 13, and the integrated value of the quantity of urea solution added through the urea addition valve 10 etc.

Then, the ECU 20 proceeds to step S203, where it determines whether or not the quantity Qu of the urea adsorbed in the NOx selective catalytic reduction catalyst 13 calculated in step S202 is equal to or larger than a first specific adsorption quantity Q1. Here, the first specific adsorption quantity Q1 is a threshold value that allows a determination that an unduly large quantity of ammonia will be discharged from the NOx selective catalytic reduction catalyst 13 if the temperature of the NOx selective catalytic reduction catalyst 13 rises with the execution of the filter temperature raising control when the quantity Qu of urea adsorbed in the NOx selective catalytic reduction catalyst 13 is equal to or larger than the first specific adsorption quantity Q1. If the determination in step S203 is affirmative, the ECU 20 proceeds to step S204, and if the determination is negative, the ECU 20 proceeds to step S208.

In step S204, the ECU 20 stops the addition of urea solution through the urea addition valve 10. Thereby, the supply of urea solution to the NOX selective catalytic reduction catalyst 13 is suspended. In consequence, the quantity of urea adsorbed in the NOX selective catalytic reduction catalyst 13 starts to decrease, as described above.

Then, the ECU 20 proceeds to step S205, where it calculates the decrease ΔQu in the quantity of urea adsorbed in the NOX selective catalytic reduction catalyst 13 since the stoppage of the addition of urea solution through the urea addition valve 10. This decrease ΔQu can be calculated from the history of the temperature of the exhaust gas flowing into the NOx selective catalytic reduction catalyst 13 and the operation state of the internal combustion engine 1 since the stoppage of the addition of urea solution through the urea addition valve 10 etc.

Then, the ECU 20 proceeds to step S206, where it calculates the quantity Qu' of urea adsorbed in the NOx selective catalytic reduction catalyst 13 at the present time by subtracting the decrease ΔQu in the quantity of adsorbed urea calculated in step S205 from the quantity Qu of urea adsorbed in the NOx selective catalytic reduction catalyst 13 calculated in step S202. In this embodiment, the ECU 20 that executes steps S202 and S206 corresponds to the adsorbed urea quantity estimation unit according to the present invention.

Then, the ECU 20 proceeds to step S207, where it determines whether or not the quantity Qu' of urea adsorbed in the NOx selective catalytic reduction catalyst 13 calculated in step S206 is equal to or smaller than a second specific adsorption quantity Q2. Here, the second specific adsorption quantity Q2 is a threshold value that allows a determination that the quantity of ammonia discharged from the NOx selective catalytic reduction catalyst 13 will fall within an allowable range even when the temperature of the NOx selective catalytic reduction catalyst 13 rises with the execution of the filter temperature raising control, if the quantity Qu' of urea adsorbed in the NOx selective catalytic reduction catalyst 13 is equal to or smaller than the second specific adsorption quantity Q2. If the determination in step S207 is affirmative, the ECU 20 proceeds to step S208, and if the determination is negative, the ECU 20 returns to step S205.

In step S208, the ECU 20 starts the addition of fuel through the fuel addition valve 9 to execute the filter regeneration control. After that, the ECU 20 once terminates execution of this routine. In this embodiment, the ECU 20 that executes step S208 corresponds to the filter temperature raising unit according to the present invention.

According to the above-described routine, if the condition for executing the filter regeneration control is satisfied at a time when the quantity of urea adsorbed in the NOx selective catalytic reduction catalyst 13 is equal to or larger than the first specific adsorption quantity, the filter regeneration control is executed after the quantity of urea adsorbed in the NOx selective catalytic reduction catalyst has decreased to be equal to or smaller than the second specific adsorption quantity. This means that the filter regeneration control can be executed in a state in which the quantity of urea adsorbed in the NOx selective catalytic reduction catalyst 13 is sufficiently small. Therefore, the discharge of ammonia from the NOx selective catalytic reduction catalyst 13 as the temperature of the NOx selective catalytic reduction catalyst 13 has been made higher by the execution of the filter regeneration control can be suppressed.

In this embodiment, the period of time taken for the quantity of urea adsorbed in the NOx selective catalytic reduction catalyst 13 to decrease from a quantity equal to or larger than the first specific adsorption quantity to a quantity equal to or smaller than the second specific adsorption quantity corresponds to the specific period of time according to the present invention.

Figure 4:
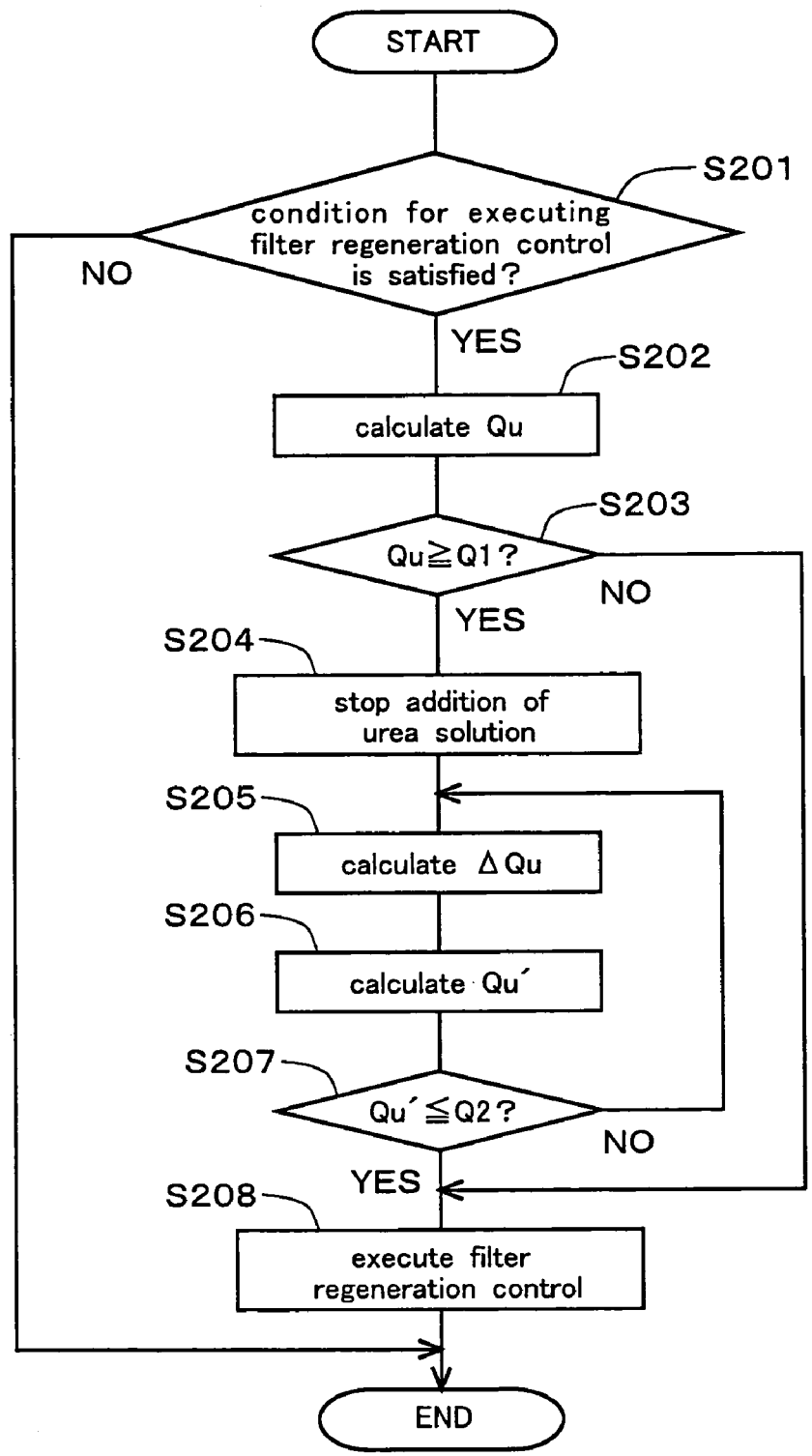
FIG. 4 is a flow chart of a filter regeneration control routine according to embodiment 2.

The routine shown in FIG. 4 may be applied in the filter regeneration control also in the case where the general configuration of the internal combustion engine and its air-intake and exhaust system according to this embodiment is modified as the above-described modification of embodiment 1. In this case also, the advantageous effects same as those of the system having the general configuration shown in FIG. 1 can be achieved.

Embodiment 3

The general configuration of an internal combustion engine and its air-intake and exhaust system according to this embodiment is the same as embodiment 1. In this embodiment also, a filter regeneration control similar to that in embodiment 1 is performed.

(Filter Regeneration Control Routine)

Figure 5:
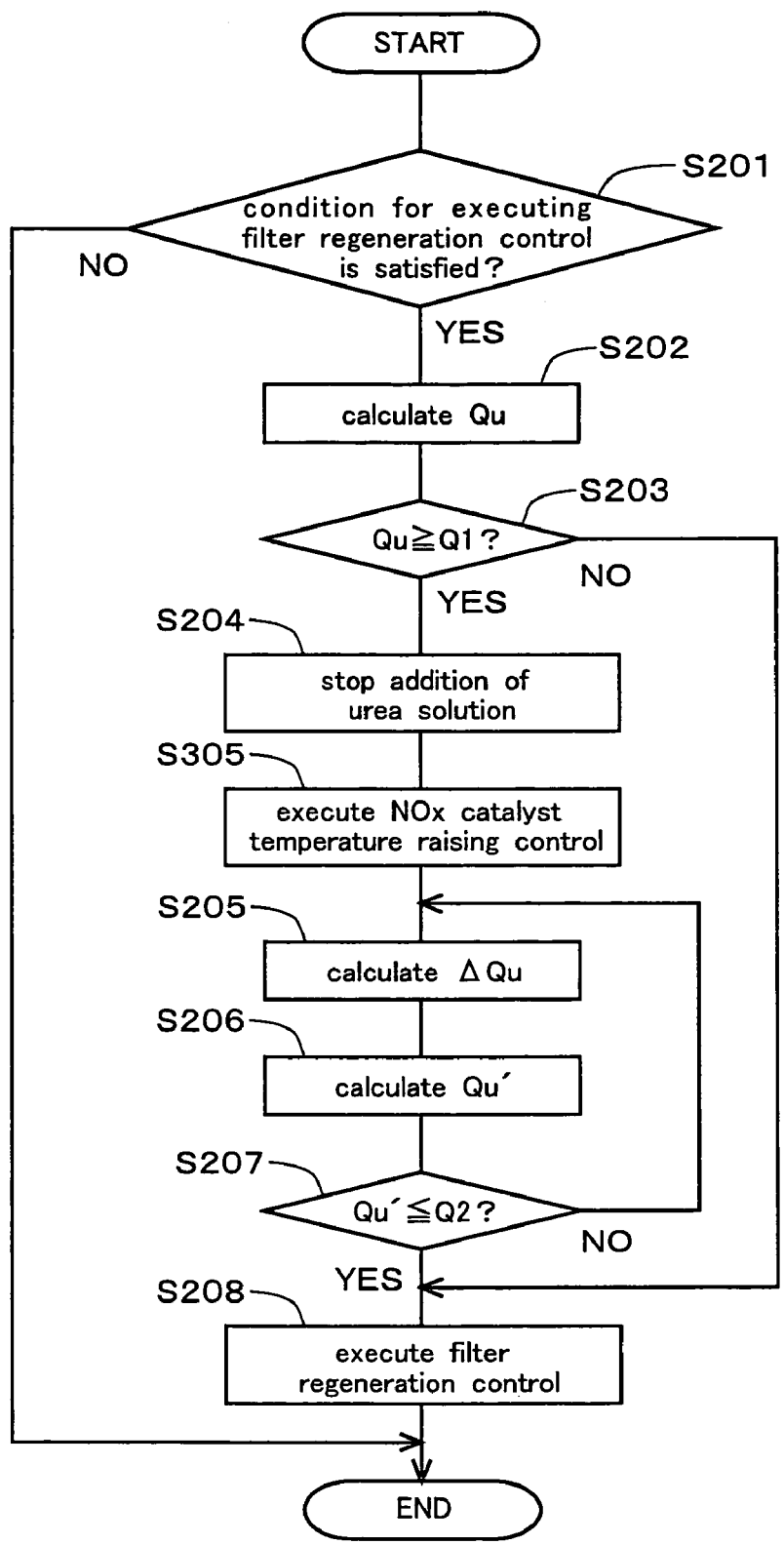
FIG. 5 is a flow chart of a filter regeneration control routine according to embodiment 3.

Here, a routine of the filter regeneration control according to this embodiment will be described with reference to the flow chart shown in FIG. 5. This routine is stored in the ECU 20 in advance, and executed repeatedly at predetermined intervals during the operation of the internal combustion engine 1. The flow chart shown in FIG. 5 is the same as the flow chart shown in FIG. 4 except for the addition of step S305. Therefore, only step S305 will be described, and description of the other steps will be omitted.

In this routine, after step S204, the ECU 20 proceeds to step S305. In step S305, the ECU 20 executes an NOx catalyst temperature raising control for raising the temperature of the NOx selective catalytic reduction catalyst 13.

The NOx catalyst temperature raising control according to this embodiment is a control that causes the temperature of the NOx selective catalytic reduction catalyst 13 to rise at a specific temperature rise rate that is lower than the temperature rise rate in the case where the temperature of the NOx selective catalytic reduction catalyst 13 rises with the execution of the filter regeneration control. The value of the specific temperature rise rate is set in such a way that the quantity of ammonia discharged from the NOx selective catalytic reduction catalyst 13 falls within a range of quantities that can be oxidized sufficiently in the ammonia oxidation catalyst 14. This temperature rise rate is determined in advance by, for example, experiments.

Specifically, the NOx catalyst temperature raising control is performed by adding fuel through the fuel addition valve 9 by a quantity that is smaller than that in the case where the filter regeneration control is executed. The fuel added through the fuel addition valve 9 is supplied to the oxidation catalyst 11 and oxidized in the oxidation catalyst 11, like in the case of the filter regeneration control. The temperature of the NOx selective catalytic reduction catalyst 13 is raised by oxidation heat generated thereby. The temperature rise rate of the NOx selective catalytic reduction catalyst 13 is controlled to the specific temperature rise rate by controlling the quantity of fuel added through the fuel addition valve 9.

In this embodiment, the ECU 20 that executes step S305 corresponds to the NOx catalyst temperature raising unit according to the present invention. After step S305, the ECU 20 proceeds to step S205.

According to the above-described routine, if the quantity of urea adsorbed in the NOx selective catalytic reduction catalyst 13 is equal to or larger than the first specific quantity at the time when the condition for executing the filter regeneration control is satisfied, the addition of urea solution through the urea addition valve 10 is stopped, and the NOx catalyst temperature raising control is executed.

When the NOx catalyst temperature raising control is executed also, hydrolysis of urea in the NOx selective catalytic reduction catalyst 13 is promoted, and the quantity of ammonia discharged from the NOx selective catalytic reduction catalyst 13 increases, as is the case when the temperature of the NOx selective catalytic reduction catalyst 13 rises with the execution of the filter regeneration control. However, in the case of the NOx catalyst temperature raising control, the temperature of the NOx selective catalytic reduction catalyst 13 is raised at the specific temperature rise rate. Therefore, the quantity of ammonia discharged from the NOx selective catalytic reduction catalyst 13 is smaller than that in the case where the temperature of the NOx selective catalytic reduction catalyst 13 rises with the execution of the filter temperature raising control, and the ammonia thus discharged is sufficiently oxidized in the ammonia oxidation catalyst 14. Therefore, outflow of ammonia to the downstream of the ammonia oxidation catalyst 14 is suppressed.

Therefore, by executing the NOx catalyst temperature raising control, the quantity of urea adsorbed in the NOx selective catalytic reduction catalyst 13 can be decreased to be equal to or smaller than the second specific adsorption quantity more quickly while suppressing outflow of ammonia to the downstream of the ammonia oxidation catalyst 14. Consequently, the filter temperature raising control can be executed at an earlier time.

In the NOx catalyst temperature raising control according to this embodiment, the temperature of the NOx selective catalytic reduction catalyst 13 may be raised by raising the temperature of the exhaust gas discharged from the internal combustion engine 1 instead of adding fuel through the fuel addition valve 9.

The routine shown in FIG. 5 may be applied to the filter regeneration control also in the case where the general configuration of the internal combustion engine and its air-intake and exhaust system according to this embodiment is modified as the above-described modification of embodiment 1. In this case also, the advantageous effects same as those of the system having the general configuration shown in FIG. 1 can be achieved.

Also in the case where the filter regeneration control is to be executed after a fixed period of time or the predetermined period of time $\Delta ts$ has elapsed since the time at which the addition of urea solution through the urea addition valve 10 was stopped, as is the case with embodiment 1, the NOx catalyst temperature raising control according to this embodiment may be executed during the lapse of the predetermined period of time $\Delta ts$. In this case, the quantity of urea adsorbed in the NOx selective catalytic reduction catalyst 13 can be further decreased while suppressing outflow of ammonia to the downstream of the ammonia oxidation catalyst 14 during the lapse of the predetermined period of time $\Delta ts$. Consequently, the amount of ammonia discharged from the NOx selective catalytic reduction catalyst 13 while the filter regeneration control is executed can be further decreased.

In the filter regeneration control according to the above-described embodiments, the temperature of the filter 12 may be raised by raising the temperature of the exhaust gas discharged from the internal combustion engine 1 instead of adding fuel through the fuel addition valve 9. Fuel may be supplied to the oxidation catalyst 11 (and the oxidation catalyst 17) by performing sub fuel injection at a time later than the main fuel injection in the internal combustion engine 1 instead of adding fuel through the fuel injection valve 9.

INDUSTRIAL APPLICABILITY

According to the present invention, in cases where an NOx selective catalytic reduction catalyst and a filter are provided in an exhaust passage of an internal combustion engine, suppression of discharge of ammonia from the NOx selective catalytic reduction catalyst can be achieved.

The invention claimed is:

1. An exhaust gas purification system for an internal combustion engine comprising:
   an NOx selective catalytic reduction catalyst that is provided in an exhaust passage of the internal combustion engine to reduce NOx in exhaust gas using ammonia as a reducing agent;
   urea supply unit for supplying urea to said NOx selective catalytic reduction catalyst;
   a particulate filter that is provided in said exhaust passage to trap particulate matter in the exhaust gas; and
   filter temperature raising unit for executing a filter temperature raising control to raise the temperature of said particulate filter; and
   an adsorbed urea quantity estimation unit for estimating the quantity of urea adsorbed in said NOx selective catalytic reduction catalyst, wherein
      when the quantity of urea adsorbed in said NOx selective catalytic reduction catalyst estimated by said adsorbed urea quantity estimation unit at a time when the condition for executing said filter temperature raising control is satisfied is equal to or larger than a first specific adsorption quantity, supply of urea to said NOx selective catalytic reduction catalyst by said urea supply unit is stopped, and said filter temperature raising control is executed by said filter temperature raising unit after a specific period of time has elapsed since the time of stoppage of supply of urea to said NOx selective catalytic reduction catalyst by said urea supply unit.

2. An exhaust gas purification system for an internal combustion engine according to claim 1, wherein said specific period of time is a period of time taken for the quantity of urea adsorbed in said NOx selective catalytic reduction catalyst estimated by said adsorbed urea quantity estimation unit to decrease to be equal to or smaller than a second specific adsorption quantity that is smaller than said first specific adsorption quantity.

3. An exhaust gas purification system for an internal combustion engine according to claim 2, further comprising:
   an ammonia oxidation catalyst that is provided in said exhaust passage downstream of said NOx selective catalytic reduction catalyst and has an ability of oxidizing ammonia; and
   NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

4. An exhaust gas purification system for an internal combustion engine according to claim 2, wherein said first specific adsorption quantity is a threshold value that allows a determination that an unduly large quantity of ammonia will be discharged from said NOx selective catalytic reduction catalyst if the temperature of said NOx selective catalytic reduction catalyst rises with execution of said filter temperature raising control when the quantity of urea adsorbed in said NOx selective catalytic reduction catalyst is equal to or larger than said first specific adsorption quantity.

5. An exhaust gas purification system for an internal combustion engine according to claim 4, wherein said second specific adsorption quantity is a threshold value that allows a determination that the quantity of ammonia discharged from said NOx selective catalytic reduction catalyst will fall within an allowable range even when the temperature of said NOx selective catalytic reduction catalyst rises with execution of said filter temperature raising control if the quantity of urea adsorbed in said NOx selective catalytic reduction catalyst is equal to or smaller than said second specific adsorption quantity.

6. An exhaust gas purification system for an internal combustion engine according to claim 5, further comprising:
   an ammonia oxidation catalyst that is provided in said exhaust passage downstream of said NOx selective catalytic reduction catalyst and has an ability of oxidizing ammonia; and
   NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

7. An exhaust gas purification system for an internal combustion engine according to claim 4, further comprising:
   an ammonia oxidation catalyst that is provided in said exhaust passage downstream of said NOx selective catalytic reduction catalyst and has an ability of oxidizing ammonia; and
   NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

8. An exhaust gas purification system for an internal combustion engine according to claim 2, wherein said second specific adsorption quantity is a threshold value that allows a determination that the quantity of ammonia discharged from said NOx selective catalytic reduction catalyst will fall within an allowable range even when the temperature of said NOx selective catalytic reduction catalyst rises with execution of said filter temperature raising control if the quantity of urea adsorbed in said NOx selective catalytic reduction catalyst is equal to or smaller than said second specific adsorption quantity.

9. An exhaust gas purification system for an internal combustion engine according to claim 8, further comprising:
   an ammonia oxidation catalyst that is provided in said exhaust passage downstream of said NOx selective catalytic reduction catalyst and has an ability of oxidizing ammonia; and
   NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

10. An exhaust gas purification system for an internal combustion engine according to claim 1, wherein said first specific adsorption quantity is a threshold value that allows a determination that an unduly large quantity of ammonia will be discharged from said NOx selective catalytic reduction catalyst if the temperature of said NOx selective catalytic reduction catalyst rises with execution of said filter temperature raising control when the quantity of urea adsorbed in said NOx selective catalytic reduction catalyst is equal to or larger than said first specific adsorption quantity.

11. An exhaust gas purification system for an internal combustion engine according to claim 10, wherein said second specific adsorption quantity is a threshold value that allows a determination that the quantity of ammonia discharged from said NOx selective catalytic reduction catalyst will fall within an allowable range even when the temperature of said NOx selective catalytic reduction catalyst rises with execution of said filter temperature raising control if the quantity of urea adsorbed in said NOx selective catalytic reduction catalyst is equal to or smaller than said second specific adsorption quantity.

12. An exhaust gas purification system for an internal combustion engine according to claim 11, further comprising:
 an ammonia oxidation catalyst that is provided in said exhaust passage downstream of said NOx selective catalytic reduction catalyst and has an ability of oxidizing ammonia; and
 NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

13. An exhaust gas purification system for an internal combustion engine according to claim 10, further comprising:
 an ammonia oxidation catalyst that is provided in said exhaust passage downstream of said NOx selective catalytic reduction catalyst and has an ability of oxidizing ammonia; and
 NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

14. An exhaust gas purification system for an internal combustion engine according to claim 1, further comprising:
 an ammonia oxidation catalyst that is provided in said exhaust passage downstream of said NOx selective catalytic reduction catalyst and has an ability of oxidizing ammonia; and
 NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

15. An exhaust gas purification system for an internal combustion engine according to claim 1, further comprising:
 an ammonia oxidation catalyst that is provided in said exhaust passage downstream of said NOx selective catalytic reduction catalyst and has an ability of oxidizing ammonia; and
 NOx catalyst temperature raising unit for executing an NOx catalyst temperature raising control to raise the temperature of said NOx selective catalytic reduction catalyst at a specific temperature rise rate that is lower than a temperature rise rate in the case where the temperature of said NOx selective catalytic reduction catalyst rises with execution of said filter temperature raising control during said specific period of time.

* * * * *